United States Patent [19]

Tsutsumi

[11] Patent Number: 5,070,414

[45] Date of Patent: Dec. 3, 1991

[54] METHOD AND APPARATUS FOR READING IMAGE INFORMATION FORMED ON MATERIAL

[75] Inventor: Teruo Tsutsumi, Tama, Japan

[73] Assignee: Kabushiki Kaisha Toshiba, Kawasaki, Japan

[21] Appl. No.: 393,951

[22] Filed: Aug. 15, 1989

[30] Foreign Application Priority Data

| Sep. 20, 1988 | [JP] | Japan | 63-235307 |
| Dec. 27, 1988 | [JP] | Japan | 63-329751 |
| Apr. 26, 1989 | [JP] | Japan | 1-106851 |

[51] Int. Cl.$^5$ ............................................. H04N 1/40
[52] U.S. Cl. ..................................... 358/466; 358/461; 358/464; 358/482
[58] Field of Search ............... 358/461, 482, 483, 465, 358/466

[56] References Cited

U.S. PATENT DOCUMENTS

| 4,567,527 | 1/1986 | Yokomizo | 358/461 |
| 4,903,144 | 2/1990 | Stefanik et al. | 358/461 |
| 4,920,428 | 4/1990 | Lin et al. | 358/461 |

Primary Examiner—Edward L. Coles, Sr.
Attorney, Agent, or Firm—Finnegan, Henderson, Farabow, Garrett, and Dunner

[57] ABSTRACT

To read a document accurately and produce an image signal faithfully representing the document, an image reading method and apparatus adopts various means, of "latching an average light-shielded signal in a digital form", "using an average light-shielded signal resulting from averaging output signals of a plurality of light-shielded pixels as a black reference signal", "replacing that part of an image signal in which an average light-shielded signal is larger than an effective pixel signal in level with a signal of a zero level", "driving CCD sensors at such timing as to allow effective pixel signals output from the CCD sensors to be continuous in time" and "setting DC offset voltages of signals output from CCD sensors to a predetermined clamp potential."

17 Claims, 7 Drawing Sheets

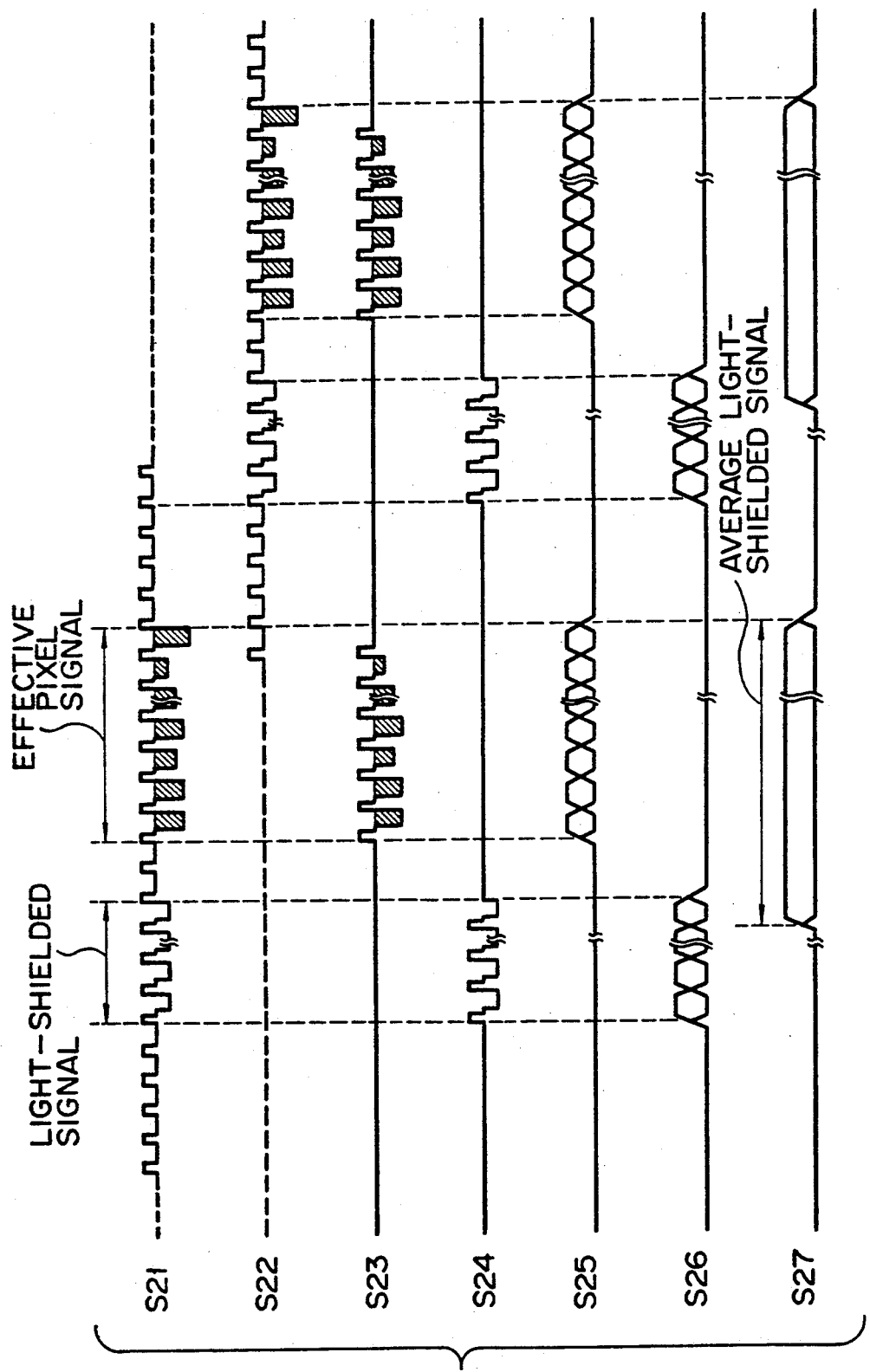
F I G. 2

METHOD AND APPARATUS FOR READING IMAGE INFORMATION FORMED ON MATERIAL

BACKGROUND OF THE INVENTION

1. Field of the Invention

The present invention relates to a method and apparatus for reading images formed of material using a line sensor and, more particularly, to a process of producing an image signal.

2. Description of the Related Art

In image readers used with equipment such as a facsimile, an image scanner, a digital copier, or the like, the image sensor is composed of a one-dimensional array of photoelectric conversion elements. The image sensor receives reflected light from the document or the document illuminated by a light source, and converts the light into an electric signal representing the image of the document.

There are two types of image readers. In the first type, the document is imaged reduced onto a CCD (charge coupled device) image sensor by a spherical lens. In the second type, the document is imaged onto an image sensor composed of an array of photoelectric conversion elements the length of which is equal in to the width of the document, with a magnification of 1:1 by equimultiple focusing optics such as a rod lens array. The second type of image reader is called a contact type image sensor.

FIG. 8 is a cross sectional view illustrating one example of the contact type image sensor. An LED (light emitting diode) array 81 has a condenser rod lens disposed thereover, which is formed slightly longer than the reading width of a document. The LED array 81 is fixed to the slant surface of a supporting member 85 so as to illuminate a document 82 at an angle of almost 45 degrees. A rod lens array 84 and an image sensor 86 are disposed under reading position 83 of document 82. The image sensor 84 is formed of an array of photoelectric conversion elements, which are mounted on supporting member 85. In rod lens array 84, a great number of so-called refractive-index distributed rod lenses, in which the refractive index progressively diminishes from center to circumference, are arrayed with the optical axes directed top to bottom in the drawing and parallel to each other. The rod lenses have focal points located at points which are symmetric with respect to the lengthwise midpoint of the array. Document 82 and image sensor 86 face each other at the focal points of the rod lenses. That is, a ray of light emitted from LED array 81 and traveling in the direction of an arrow indicated is transmitted through rod lens array 84 after reflection from the document and then imaged onto the photoelectric conversion elements of image sensor 86.

Image sensor 86 is electrically connected to a circuit board 87 via a terminal 88. An electronic circuit including a driving circuit for driving and controlling image sensor 86, a circuit for processing signals resulting from photoelectric conversion in image sensor 86, and a connector 89 adapted for signal communication with, for example, facsimile incorporating the image reader are mounted on circuit board 87.

There are various types of image sensors. The thin film type uses a line sensor which is produced by a thin film technique and is longer than the width of a row to be scanned of the document. The multichip type in has a plurality of IC line sensors which are arrayed to cover the scanning length. FIG. 9 is a plan view of one example of the multichip type image sensor. In this example, four CCD sensors (line sensors) 91, 92, 93 and 94 are arrayed in a staggered fashion.

One of properties of the line sensor described above is that its output characteristics vary with ambient temperature. That is, even if the amount of incident light remains unchanged, the output signal level varies as ambient temperature varies. It is thus required to carry out compensation for output-level errors due to variation in ambient temperature, the so-called dark signal compensation.

For this reason, as shown in FIG. 9, end portions 91a to 94a of CCD sensors 91 to 94, which are on the signal reading start position side, are shaded by a metal film to make light-shielded pixels (about ten pixels in general) for each sensor, which produce optical black reference signals for the dark signal compensation. That is, the amount of light incident on the light-shielded pixels is zero, and their output signals (light-shielded signal) represent pure black in the state under the influence of ambient temperature. Hence, differential amplification of an output signal (an effective signal) output from a nonshaded photoelectric conversion element (an effective pixel) and the light-shielded signal will produce a signal free from the influence of variation in ambient temperature.

However, there are various problems with the conventional image reader, as described below.

(1) Since the black reference signal output from the light-shielded pixel in the end portion of a line sensor is used for compensating the signals output from all the effective pixels in the line sensor, a sample and hold circuit must be used to hold the black reference signal for a scanning interval of the line sensor. With the sample and hold circuit, however, there is a possibility of reduction of its holding voltage with time due to the leakage of a capacitor, the insulation performance of the circuit board and the characteristics of an operational amplifier. If the holding voltage is reduced, dark signal compensation will not be performed accurately.

(2) Line sensors such as CCD sensors may differ from each other in direct-current offset voltage of output signal. With the above multichip type of image reader, therefore, the direct-current offset voltages may vary in part in the output image signal, and the image reader will not produce an accurate image signal.

(3) In such a multichip type of image reader as shown in FIG. 9, CCD line sensors 91 to 94 are sequentially driven in such a way that when the scanning operation of one CCD sensor is completed, the next CCD sensor starts scanning. Hence, if light-shielded pixels are provided to obtain the black reference signals for the dark signal compensation as described above, non-signal portions will be produced in effective pixel signals in serializing the effective pixel signals output from effective pixels of the line sensors, causing inconvenience to treatment of signals.

(4) Output signals from the light-shielded pixels in each of line sensors are sequentially entered into and held by a sample and hold circuit. That is, the signal used as a black reference signal is the signal which is at last applied to the sample and hold circuit within the signals output from a plurality of light-shielded pixels respectively. However, photoelectric conversion elements constituting the same line sensor may produce slightly varying outputs because of variations in their performance though they are shaded. Hence, the signal output from one of light-shielded pixels is not necessarily suited for the black reference signal.

As described above, the conventional image reader suffers from a disadvantage in that normal image signals cannot be obtained because of various causes.

SUMMARY OF THE INVENTION

It is accordingly an object of the present invention to provide an image reading method and apparatus which accurately reads image information formed on a document and produces an image signal faithfully representing the image information.

According to an aspect of the invention there is provided an image reader comprising: a line sensor comprising a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;

analog to digital conversion means for converting the light-shielded signals to digital light-shielded signals;

holding means for holding the digital lightshielded signals; and image signal producing means for correcting a first signal corresponding to the effective pixel signals in accordance with a second signal corresponding to the digital light-shielded signals held by said holding means, and generating an image signal.

According to another aspect of the invention there is provided an image reader comprising: image reading means having an array of a plurality of line sensors for generating output signals having DC offset voltages, each of said sensors has a one-dimensional array of a plurality of photoelectric conversion elements; and a plurality of clamp means provided in correspondence with said line sensors, for clamping the DC offset voltages to a predetermined potential.

According to still another aspect of the invention there is provided an image reader comprising: a line sensor having a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;

average signal producing means for averaging at least two of the light-shielded signals to produce an average signal;

holding means for holding the average signal produced by the average signal producing means; and image signal producing means for correcting a first signal corresponding to the effective pixel signals in accordance with a second signal corresponding to the average signal held by said holding means.

According to a further aspect of the invention, there is provided an image reader comprising: image reading means comprising an array of a plurality of line sensors each of which is a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;

drive controlling means for sequentially driving said line sensors at such timing as to allow the effective pixel signals output to be continuous in time; and signal selecting means for selecting the effective pixel signals to output the selected signal as a serial signal.

According to a further aspect of the invention there is provided an image reader comprising: image reading means comprising an array of a plurality of line sensors each of which is a one-dimensional array of a plurality of photoelectric conversion elements for outputting photoelectric conversion signals, said plurality of photoelectric conversion elements being selectively shaded to provide light-shielded pixels for outputting light-shielded signals and effective pixels S which are not shaded for outputting effective pixel signals; drive controlling means for sequentially driving said line sensors in a predetermined order at a predetermined timing so that the effective pixel signals are continuously outputted;

group-serializing means for dividing the photoelectric conversion signals output from said line sensor into a plurality of groups each having the photoelectric conversion signals which are not neighbored to one another and which are selectively extracted from the photoelectric conversion signals output from said line sensors, and serializing the selectively extracted signals for each group to produce a serialized photoelectric conversion signal;

analog to digital conversion means for converting the serialized photoelectric conversion signals to digital serialized photoelectric conversion signals;

holding means for holding light-shielded signals in the digital serialized photoelectric conversion signals;

black reference signal producing means for serializing the light-shielded signals held by said holding means for separate groups to produce a black reference signal;

effective signal producing means for serializing the effective pixel signals in the digital serialized photoelectric conversion signals to produce a serial effective pixel signal; and image signal producing means for correcting the serial effective pixel signal in accordance with the black reference signal and generate an image signal.

According to a further aspect of the invention there is provided a method of reading an image comprising the steps of: converting reflected light from document into a photoelectric conversion signal by the use of a line sensor of a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;

converting the light-shielded signals in digital light-shielded signals;

holding the digital light-shielded signals; and correcting a first signal corresponding to the effective pixel signals in accordance with a second signal corresponding to the held light-shielded signals.

According to a further object of the invention there is provided a method of reading an image comprising the steps of: converting reflected light from document into a photoelectric conversion signal having DC offset voltages, by the use of image reading means comprising an array of a plurality of line sensors each of which includes a one-dimensional array of a plurality of photoelectric conversion elements; and setting the DC offset voltages to a predetermined potential.

According to a further aspect of the invention there is provided a method of reading an image comprising the steps of: photoelectric converting reflected light from document by the use of a line sensor having a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;

averaging at least two of the light-shielded signals produce an average signal;

holding the average signal; and correcting a first signal corresponding to the effective pixel signals in accordance with a second signal corresponding to the held average signal.

According to a further object of the present invention there is provided a method of reading an image comprising the steps of: sequentially driving a plurality of line sensors, for producing photoelectric conversion signals, each of said line sensors having effective pixels for producing effective pixel signals and lightshielded pixels for producing light-shielded signals, at such timing as to allow the effective pixel signals to be continuous in time;

converting reflected light from document in a photoelectric conversion signals by means of the line sensors; and selecting the effective pixel signals to output the selected signal as a serial signal.

According to a further object of the present invention there is provided a method of reading an image comprising the steps of: sequentially driving a plurality of line sensors for producing photoelectric conversion signals, each of said line sensors having effective pixels for producing effective pixel signals and light-shielded pixels for producing light-shielded signals, in a predetermined order at a predetermined timing so that the effective pixel signals are continuously outputted;

converting reflected light from document into a photoelectric conversion signal by means of line sensors;

for dividing the photoelectric conversion signals output from said line sensor into a plurality of groups each having the photoelectric conversion signals which are not neighbored to one another and which ar selectively extracted from the photoelectric conversion signals output from said line sensors, and serializing the selectively extracted signals for each group to produce a serialized photoelectric conversion signal;

digitizing the serialized photoelectric conversion signals for each of groups;

holding light-shielded signal in the digitized photoelectric conversion signals for each of groups for a predetermined time interval;

serializing the light-shielded signals held for the respective groups to produce a black reference signal;

serializing the effective pixel signals in digitized photoelectric conversion signals for the respective groups to produce a serial effective pixel signal; and correcting the serial effective pixel signal in accordance with the black reference signal to produce an image signal.

BRIEF DESCRIPTION OF THE DRAWINGS

FIG. 2 is a timing diagram of signals developed at various locations within the image reader of FIG. 1;

DETAILED DESCRIPTION OF THE PREFERRED EMBODIMENTS

Figure 1:
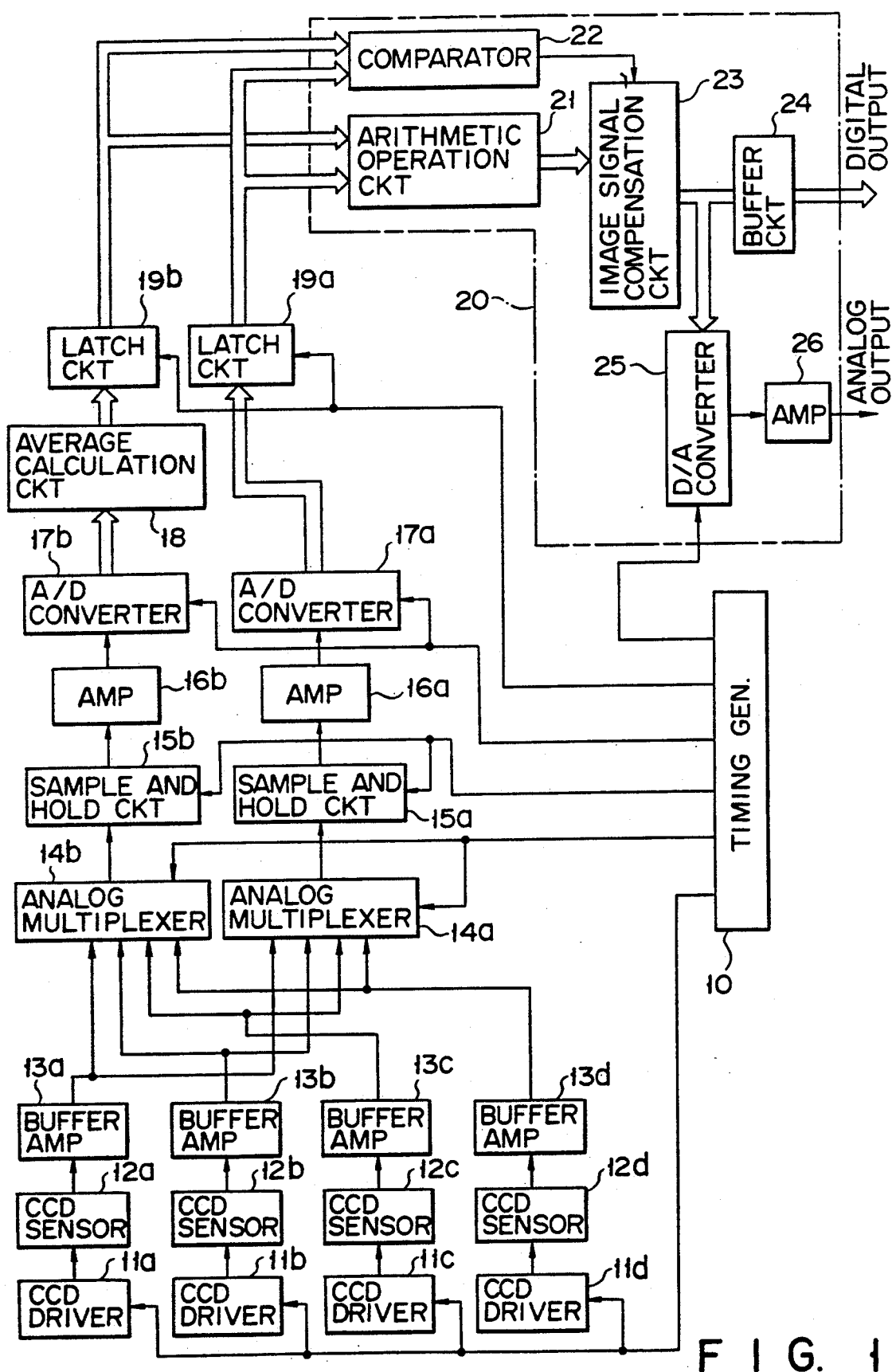
FIG. 1 is a block diagram of an image reader according to a first embodiment of the present invention.

Referring now to FIG. 1, an image reader according to a first embodiment of the invention comprises a timing generator 10, CCD drivers 11a, 11b, 11c and 11d, CCD sensors 12a, 12b, 12c and 12d, buffer amplifiers 13a, 13b, 13c and 13d, analog multiplexers 14a and 14b, sample and hold circuits 15a and 15b, amplifiers 16a and 16b, analog to digital (A/D) converters 17a and 17b, an average operation circuit 18, latch circuits 19a and 19b and an image signal producing circuit 20. Image signal producing circuit 20 comprises an arithmetic operation circuit 21, a comparator 22, an image signal compensating circuit 23, a buffer circuit 24, a digital to analog (D/A) circuit 25 and an amplifier 26.

In response to control signals from equipment for example, a facsimile, a digital copier or the like) with which the present image reader is used, timing generating circuit 10 provides clock pulses and switching signals to CCD drivers 11a to 11d, analog multiplexers 14a, 14b, sample and hold circuits 15a, 15b, A/D converters 17a, 17b, latch circuits 19a, 19b and D/A converter 25 to control the drive timing thereof.

CCD sensors 12a to 12d each have a great number of photoelectric conversion elements arrayed one-dimensionally and arranged in a staggered fashion, for example. Among the numerous pixels forming each of CCD sensors 12a to 12d several pixels (usually about ten pixels) which are located on the reading start position side are shaded by metal film to provide light-shielded pixels. CCD drivers 11a to 11d are respectively connected to CCD sensors 12a to 12d. The CCD drivers 11a to 11d receive clock pulses, shift pulses and reset pulses from timing generator 10 and amplify them for application to corresponding CCD sensors. As a result, CCD sensors 12a to 12d are sequentially driven to carry out photoelectric conversion and storage and transfer of signal charges, (i.e., the scanning operations for reading a document. Among CCD sensors 12a to 12d CCD sensor 12a is initially driven, and CCD sensor 12b is then driven after the scanning operation of CCD sensor 12a is completed. Likewise CCD sensors 12c and 12d are driven in sequence.

Buffer amplifiers 13a to 13d are respectively connected to CCD sensors 12a to 12d. Each buffer amplifier 13a to 13d is comprised of an emitter follower circuit to reduce the impedance of an input signal. Output signals of CCD sensors 12a to 12d are applied to buffer amplifiers 13a to 13d, respectively, for impedance conversion. That is, being high in impedance and thus subject to the influence of noise, the output signals of CCD sensors 12a to 12d immediately undergo impedance conversion to low impedance. The signals subjected to impedance conversion in buffer amplifiers 13a to 13d are then applied to analog multiplexers 14a and 14b.

Each of analog multiplexers 14a and 14b is responsive to clock pulses from timing generator 10 to select output signals from buffer amplifiers 13a to 13d in a predetermined sequence, thus producing a serial signal. It is to be noted here that analog multiplexer 14a is adapted only for effective image signals output from effective pixels of CCD sensors 12a to 12d, while analog multiplexer 14b is adapted only for light-shielded signals output from the light-shielded pixels of the CCD sensors. That is, the output signal of analog multiplexer 14a consists of the effective signals, while the output signal of analog multiplexer 14b consists of the light-shielded signal. The effective pixel signal and light-shielded signal output from analog multiplexers 14a and 14b are applied to sample and hold circuits 15a and 15b, respectively.

Sample and hold circuits 15a and 15b sample and hold the effective pixel signal and light-shielded signal applied thereto, respectively, for subsequent A/D conversion by A/D converters 17a and 17b. The signals held by sample and hold circuits 15a, 15b are low in level and generally lie in the range of tens of mV to hundreds of mV. The signals are thus amplified by amplifiers 16a and 16b up to a level necessary for A/D conversion in A/D converters 17a and 17b. The amplified signals are applied to A/D converters 17a and 17b, and converted to digital signals each of 8 bits, for example. It is to be noted that when flash A/D converters are used for A/D converters 17a, 17b, sample and hold circuits 15a, 15b may be dispensed with.

A/D converter 17a is connected to a latch circuit 19a which latches an effective pixel signal digitized by A/D converter 17a for a predetermined time interval. A/D converter 17b is connected to an average value calculation circuit 18 which calculates the average value of signal levels of the light-shielded signals (for several pixels) from one CCD sensor. Data on the average value calculated by average value calculation circuit 18, i.e., the average light-shielded signal is applied to latch circuit 19b. Latch circuit 19b latches the average light-shielded signal for a predetermined time interval.

The effective pixel signal and average light-shielded signal held by latch circuits 19a and 19b are applied to an arithmetic operation circuit 21, which subtracts the average light-shielded signal from the effective pixel signal. Consequently the effective pixel signal is subjected to the dark signal compensation, resulting in an image signal. The effective pixel signal and average light-shielded signal are also applied to comparator 22, which makes a comparison in level between the effective pixel signal and the light-shielded signal, and provides an output signal when the average light-shielded signal is higher than the effective pixel signal in level. The image signal produced by arithmetic operation circuit 21 and the output signal of comparator 22 are applied to image signal compensation circuit 23, from which the image signal from arithmetic operation circuit 21 is usually output intact. However, when the output signal of the comparator is applied, i.e., when the average light-shielded signal is higher than the effective pixel signal in level, compensation circuit 23 does not output the image signal from arithmetic operation circuit 21, but provides a logic level 0 as an image signal. The image signal output from image signal compensation circuit 23 has its impedance lowered by buffer circuit 24 to enhance its noise immunity and is then applied to equipment such as facsimile to which the image reader is applied.

The image signal is also supplied from image signal compensation circuit 23 to D/A converter 25, which converts the input image signal to an analog signal. The analog signal is in turn applied to the facsimile.

In operation, CCD sensors 12a to 12d sequentially scan the document to read it under the control of timing generator 10 and CCD drivers 11a to 11d. As a result, CCD sensor 12a provides such a signal as indicated at S21 in FIG. 2. Next CCD sensor 12b starts scanning at the same time the scanning operation of CCD sensor 12a is completed, whereby such a signal as indicated at S22 in FIG. 2 is obtained. Subsequently CCD sensors 12c and 12d likewise perform sequential reading operation so that signals similar to S21 and S22 in FIG. 2 are output delayed in time though not shown. As shown in FIG. 2, each of the output signals of CCD sensors 12a to 12d is a pulselike analog signal in the range of—tens of mV to—hundreds of mV (a value corresponding to the amount of incident light on CCD sensor, or the density of document) with respect to DC offset voltage.

Output signals of CCD sensors 12a to 12d have their effective pixel signals serialized by analog multiplexer 14a, resulting in a multiplexed image signal indicated at S23 in FIG. 2. Similarly the light-shielded signals are serialized by analog multiplexer 14b to produce a multiplexed light-shielded signal indicated at S24 in FIG. 2. The multiplexed effective pixel signal and light-shielded signal are converted to digital signals by A/D converters 17a and 17b, respectively, resulting in a digitized effective pixel signal indicated at S25 and a digitized light-shielded signal indicated at S26 in FIG. 2.

The effective pixel signal digitized by A/D converter 17a is latched by latch circuit 19a. The light-shielded signal digitized by A/D converter 17b is applied to average-value calculating circuit 18 to be subjected to averaging. More specifically, each CCD sensor has, for example, ten pixels and the digital light-shielded signal for each CCD sensor thus has ten pieces of data representing signal levels. Average-value calculation circuit 18 calculates the average of levels that ten pieces of data represent and then provides the resulting average data to latch circuit 19b as the average light-shielded signal. Latch circuit 19b holds the average light-shielded signal until the scanning operation of one CCD sensor is completed. Hence, the output signal of latch circuit 19b will be represented as a signal indicated at S27 in FIG. 2.

Thus, the effective pixel signal is dark signal compensated by subtracting the average light-shielded signal in latch circuit 19b from the effective pixel signal once latched in latch circuit 19a in arithmetic operation circuit 21 with the light-shielded signal as the black reference signal, resulting in the image signal. The resultant image signal is compensated by image signal compensating circuit 23 according to the result of the comparison in comparator 22 and then output via buffer circuit 24 as a digital signal or via amplifier 26 in analog form after conversion in D/A converter 25.

Depending upon variations in sensitivity of a great number of photoelectric conversion elements forming the CCD sensors, the level of the effective pixel signals may be smaller than the level of the average light-shielded signal. In this case, the absolute value of the operation result of arithmetic operation circuit 21 would become great, whereby no correct signal is obtained. When the effective pixel signal is smaller than the light-shielded signal in level, therefore, an image signal corresponding to that portion in which the effective pixel signal is smaller than the average light-shielded signal is replaced with a signal of 0 level in image signal compensating circuit 23.

With the image reader of the present invention, as described above, since the average light-shielded signal used for the dark signal compensation is latched in a digital form, the average light-shielded signal can always be held at the same value. Therefore, the dark signal compensation will be carried out using a reference signal which is always correct. It is only for a short time taken to digitize a signal that sample and hold circuits 34a and 34b hold signals. Thus no variation in signal level will occur.

Since, as the black reference signal, use is made of the average light-shielded signal resulting from averaging of output signals of a plurality of light-shielded pixels, the black reference signal will be obtained which allows for errors of light-shielded signals due to variations in sensitivity of light-shielded pixels.

In the present embodiment, a comparison is made between the effective pixel signal and the average light-shielded pixel signal so that an image signal corresponding to part in which the average light-shielded signal is larger than the effective pixel signal in level may be replaced with a signal of 0 level. Even if an error signal not corresponding to the image is produced because of the effective pixel signal being smaller than the average light-shielded signal, the error signal will be corrected to a signal of 0 level, i.e., a signal representing black.

Furthermore, the present embodiment enables the produced image signal to be output both in digital and analog forms. Hence entering the image signal in a digital form into external equipment, such as a facsimile, to which the present image reader is applied, will provide advantages of good interface with the external equipment and strong resistance to disturbing noise because of increased S/N ratio. When the image signal is entered into the external equipment in analog form, on the other hand, the number of cables for interfacing with the external equipment will be decreased.

The above embodiment may be modified in various ways. That is, the above embodiment take such various measures as "latching the average light-shielded signal in digital form", "using the average light-shielded signal representing the average of output signals of a plurality of light-shielded pixels as the black reference signal", "making a comparison between the effective pixel signal and the average light-shielded signal to replace that portion of an image signal in which the light-shielded signal is larger than the effective pixel signal in level with a signal of zero level", and "enabling the produced image signal to be output both in digital and analog forms." In the present invention, however, it is necessary only that at least one of the measures be taken.

Figure 3:
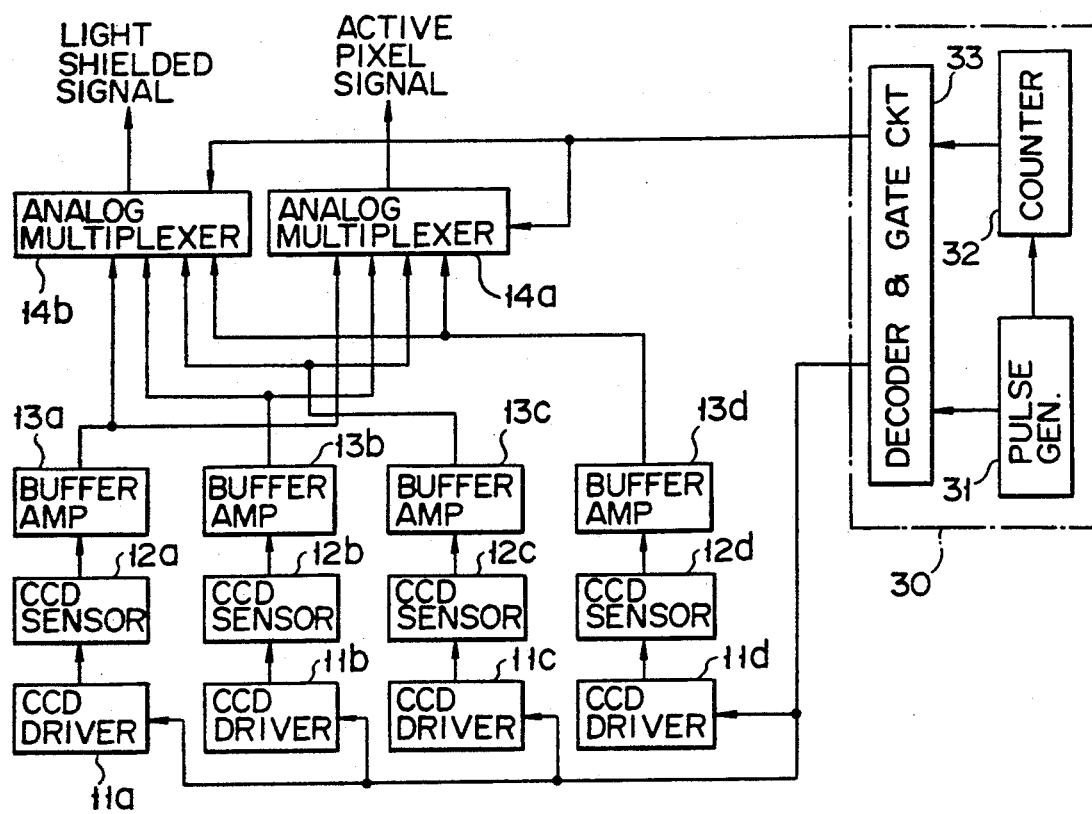
FIG. 3 is a block diagram of an image reader according to a second embodiment of the present invention.

FIG. 3 is a block diagram of an image reader according to a second embodiment of the present invention, in which like reference characters are used to designate corresponding parts to those of FIG. 1 and description thereof will be omitted.

The image reader comprises timing generator 30, CCD drivers 11a to 11d, CCD sensors 12a to 12d, buffer amplifiers 13a to 13d, and analog multiplexers 14a and 14b. Timing generator 30 comprises a pulse generator 31, a counter 32 and a decoder & gate circuit 33.

Pulse generator 31 generates pulses at a driving frequency of CCD sensors 12a to 12d. Counter 32 and decoder & gate circuit 33 are connected to receive the pulses from pulse generator 31. Counter 32 counts the pulses input thereto and provides a count-up signal to decoder & gate circuit 33 after counting a predetermined number of pulses. In other words, counter 32 produces pulses whose period is an integral multiple of the period of the pulses generated by pulse generator 31. The predetermined number to be counted by counter 32 is equal to the number of the effective pixels in each CCD sensor.

Decoder & gate circuit 33 decodes and clocks the outputs from pulse generator 31 and counter 32 to produce clock pulses, shift pulses, reset pulses for driving CCD sensors 12a to 12d and clock pulses for driving the analog multiplexers.

Next, the operation of the second embodiment will be described.

Each of CCD sensors 11a to 11d is comprised of an array of a great number of photoelectric conversion elements and divided into effective pixels and light-shielded pixels as described previously. More specifically, there are provided several vacant feed pixels before and behind the light-shielded pixels (for example, four pixels before and two pixels behind). The light-shielded pixels and vacant feed pixels are referred to as dummy pixels.

The image reader of the second embodiment causes the CCD sensors 12a to 12d to perform the sequential scanning in the same manner as the image reader according to the first embodiment, but is different from the first embodiment in timing of commencement to drive CCD sensors 12a to 12d as described below.

First, timing generator 30 instructs commencement of driving of CCD sensor 12a. At the same time counter 32 starts counting pulses. Subsequently, CCD sensor 12a scans the document.

In this state, upon counting of the number n of the effective pixels that one CCD sensor has, counter 32 produces a count-up signal. Upon receipt of the count-up signal from counter 32, decoder & gate circuit 33 instructs commencement of driving of the next CCD sensor 12b. At this point the scanning operation of CCD sensor 12a is not completed and hence CCD sensor 12a and CCD sensor 12b will perform simultaneous scanning operations for a while. Similarly, CCD sensors 12c and 12d are sequentially commenced to be driven each time counter 32 counts n after one CCD sensor starts to be driven.

It is during a time interval from the time the driving of CCD sensor 12a is commenced until the next CCD sensor 12b starts to be driven that CCD sensor 12a scans n pixels. Assuming the total number of pixels of one CCD sensor to be m, therefore, m−n pixels are scanned during a time interval when CCD sensors 12a and 12b are driven simultaneously. Since n is the number of the effective pixels, m−n represents the number of the dummy pixels. Hence CCD sensor 12b scans the dummy pixels until the scanning operation of CCD sensor 12a is completed and commences to scan the effective pixels at a point of time when the scanning operation of CCD sensor 12a is completed. Accordingly, CCD sensors 12a to 12d produce such output signals as indicated at S41 to S44 in FIG. 4, respectively.

Figure 4:
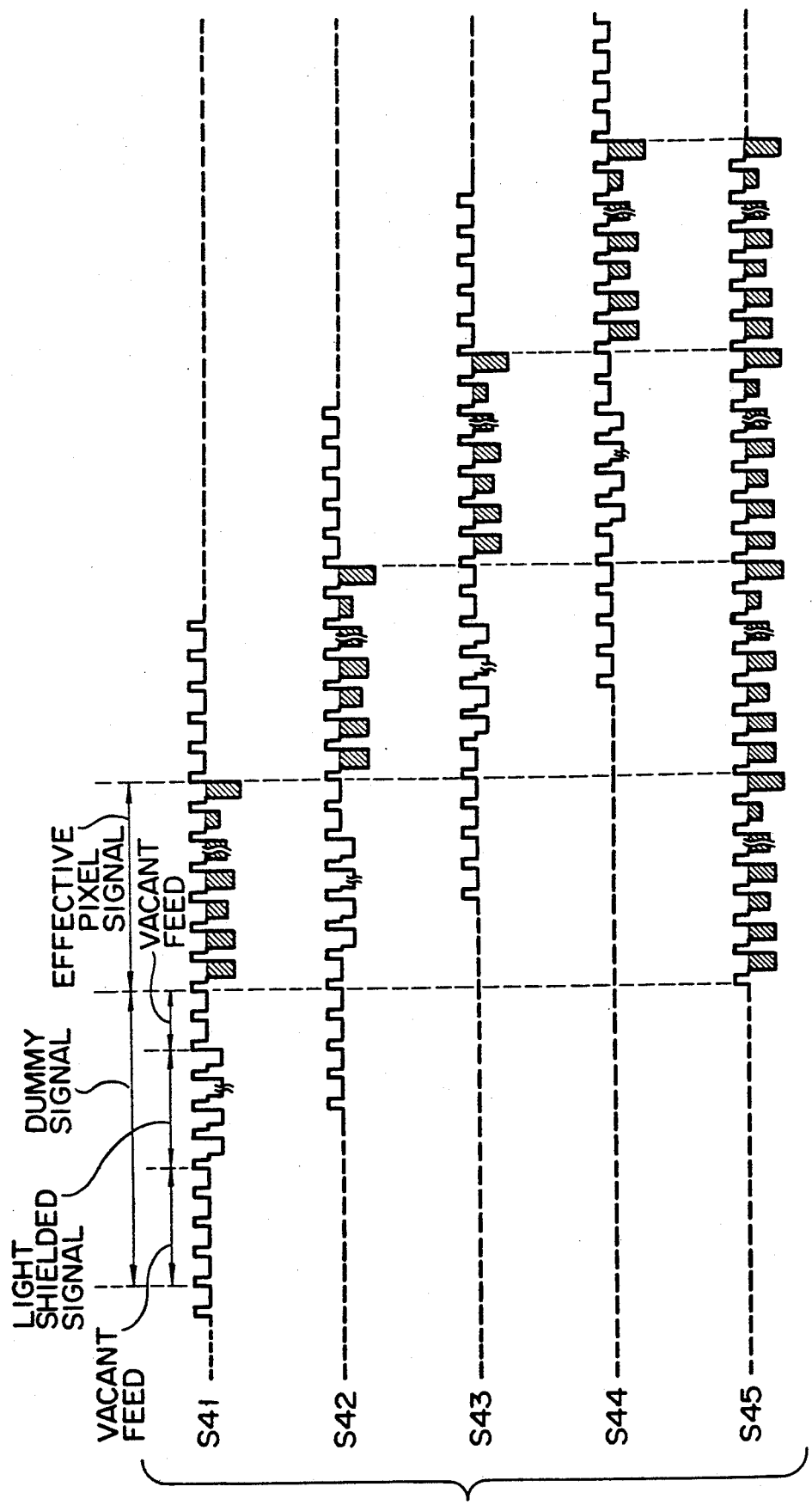
FIG. 4 is a timing diagram of signals developed at various locations within the image reader of FIG. 3.

Serializing the effective pixel signals contained in the output signals of CCD sensors 12a to 12d by analog multiplexer 14a will produce an effective pixel signal in which the effective pixel signals from CCD sensors 12a to 12d are completely continuous as indicated at S45 in FIG. 4.

The effective pixel signal output from analog multiplexer 14a and the light-shielded signal separately serialized by analog mutiplexer 14b are used together for dark signal compensation.

With the image reader, as described above, CCD sensors 12a to 12d are subjected to such a timing control for driving as allows the effective pixel signals output from respective CCD sensors 12a to 12d to be continuous in time. Thus, simply serializing the effective pixel signals output from CCD sensors 12a to 12d by use of analog multiplexer 14a will result in complete continuity of the effective pixel signals, obviating the necessity of signal processing for causing the effective pixel signals or produced image signal to be continuous by use of a large-capacity memory.

Figure 5:
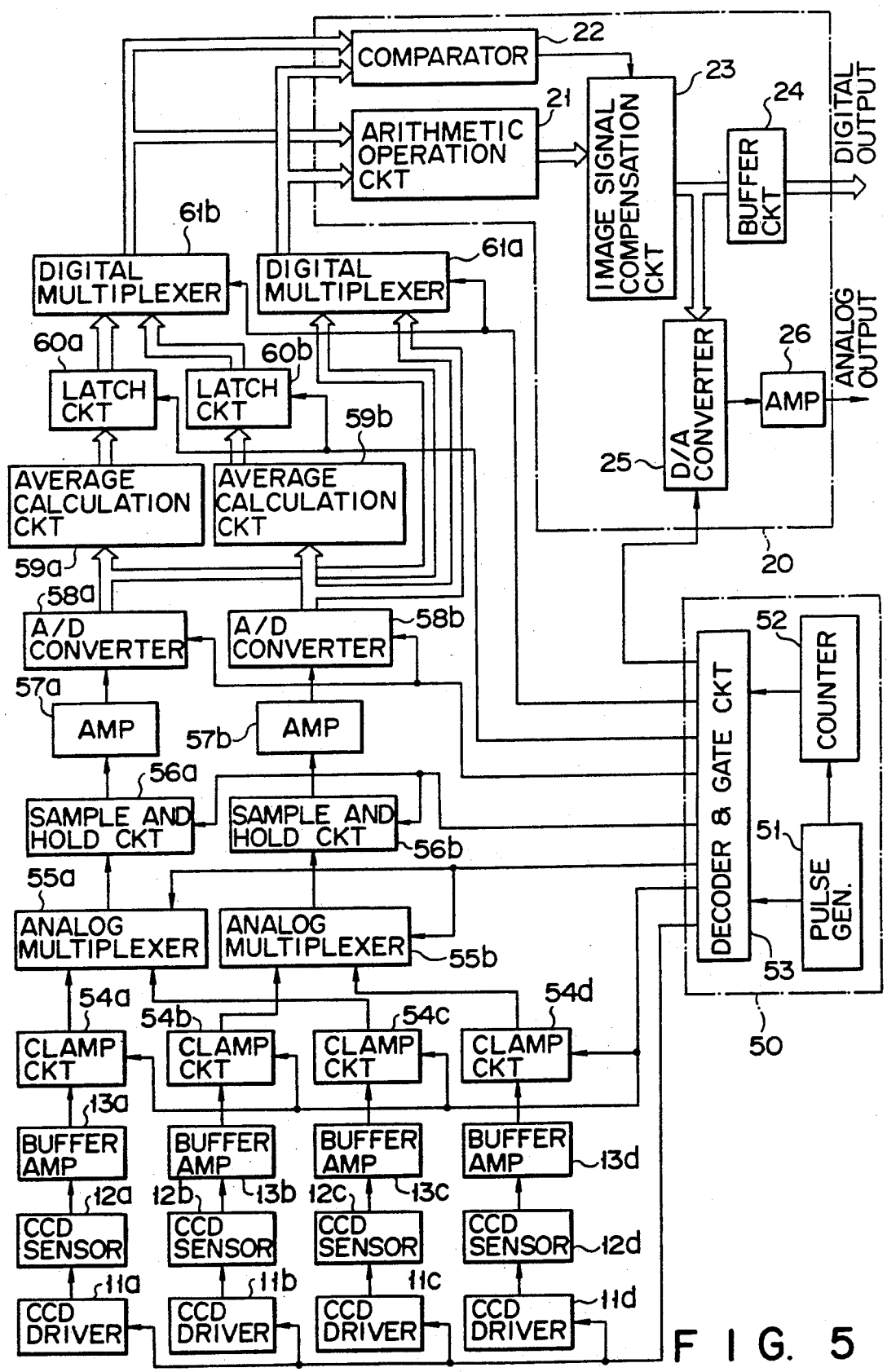
FIG. 5 is a block diagram of an image reader according to a third embodiment of the present invention.

In FIG. 5, there is illustrated a block diagram of an image reader according to a third embodiment of the present invention, in which like reference characters are used to designate corresponding parts to those of FIGS. 1 and 3 and description thereof will be omitted.

The image reader of the third embodiment comprises timing generator 50, CCD drivers 11a to 11d, CCD sensors 12a to 12d, buffer amplifiers 13a to 13d, clamp circuits 54a to 54d, analog multiplexers 55a and 55b, sample and hold circuits 56a and 56b, amplifiers 57a and 57b, A/D converters 58a and 58b, average-value calculating circuits 59a and 59b, latch circuits 60a and 60b, digital multiplexers 61a and 61b and image signal producing circuit 20. Timing generator 50 comprises a pulse generator 51, a counter 52 and a decoder & gate circuit 53. Image signal producing circuit 20 comprises arithmetic operation circuit 21, comparator 22, image signal compensating circuit 23, buffer circuit 24, D/A converter 25 and amplifier 26.

Timing generator 50 operates in substantially the same manner as timing generator 30 in the previous second embodiment. In timing generator 50, decoder & gate circuit 53 produces control signals for CCD drivers 11a to 11d, clamp circuits 54a to 54d, analog multiplexers 55a and 55b, sample and hold circuits 56a and 56b, A/D converters 58a and 58b, latch circuits 60a and 60b, digital multiplexers 61a and 61b and D/A converter 25.

Buffer amplifiers 13a to 13d are respectively connected to clamp circuits 54a to 54d which receive signals output from CCD sensors 12a to 12d and subjected to impedance conversion as in the second embodiment. Each of the clamp circuits 54a to 54d is adapted to clamp a DC offset voltage of an input signal to a predetermined potential. Clamp circuits 54a and 54b are connected to analog multiplexer 55a, while clamp circuits 54b and 54d are connected to analog multiplexer 55b.

Analog multiplexer 55a is responsive to clocks from timing generator 50 to alternately transmit output signals of clamp circuits 54a and 54c for conversion to a serial signal (hereinafter referred to as a first group signal). Likewise analog multiplexer 55b is responsive to clocks from timing generator 50 to alternately transmit output signals of clamp circuits 54b and 54d for conversion to a serial signal (hereinafter referred to as a second group signal). Sample and hold circuits 56a and 56b are connected to analog multiplexers 55a and 55b, respectively.

Sample and hold circuits 56a and 56b respectively sample the first and second group signals and hold sampled signals for subsequent A/D conversion in A/D converters 58a and 58b. Having a low level in the range of tens to hundreds of mV, the signals held in sample and hold circuits 56a and 56b are amplified by amplifiers conversion in A/D converters 58a and 58b. The amplified signals are applied to A/D converters 58a and 58b for A/D conversion. The first and second group signals are thus converted to a digital signal of 8 bits by way of example. Where flash A/D converters are used for A/D converters 58a and 58b, sample and hold circuits 56a and 56b may be omitted.

A/D converters 58a and 58b are connected to average-value calculating circuits 59a and 59b, respectively, on one hand and to digital multiplexer 61a on the other hand. The light-shielded signals, which are contained in the first and second group signals output in digital form from A/D converters 58a and 58b, are applied to average-value calculating circuits 59a and 59b. On the other hand, the effective pixel signals, which are contained in the first and second group signals output in digital form from A/D converters 58a and 58b, are applied to digital multiplexer 61a.

Each of average-value calculating circuits 59a and 59b calculates the average value of the light-shielded signals for several pixels in one-chip CCD sensor. Data on the average values calculated by average-value calculating circuits 59a and 59b, i.e., the average light shielded signals are applied to latch circuits 60a and 60b, which respectively hold the average light-shielded signals of the first and second groups for a predetermined time interval. Latch circuits 60a and 60b are connected to digital mutiplexer 61b, which alternately output the first and second group light-shielded signals held by latch circuits 60a and 60b for conversion to a serial light-shielded signal.

On the other hand, the first and second group effective pixel signals are alternately selected by digital multiplexer 61a for conversion to a serial effective pixel signal. The effective pixel signal and the light-shielded signal thus produced by digital multiplexers 61a and 61b are applied to image signal producing circuit 20, which processes the effective pixel signal and light-shielded signal in the same manner as the first embodiment.

Figure 6:
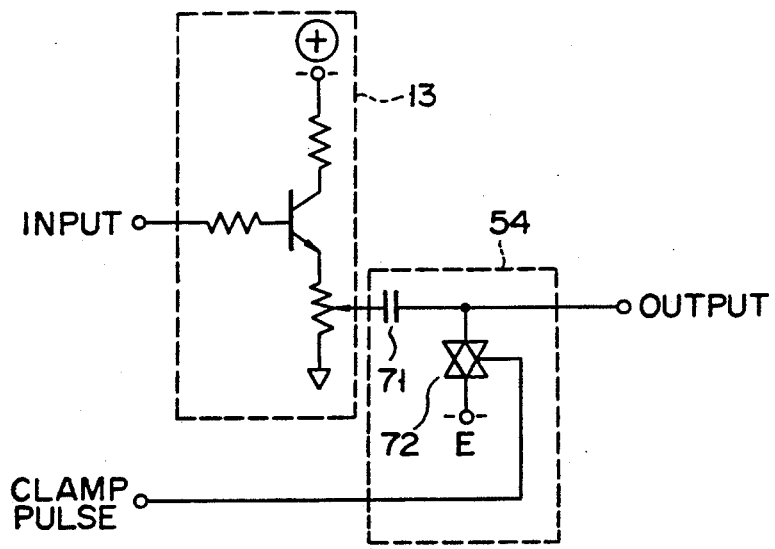
FIG. 6 is a circuit diagram of the clamp circuits of FIG. 5.

FIG. 6 illustrates an exemplary circuit arrangement of the clamp circuit and buffer amplifier.

Buffer amplifier 13 is comprised of an emitter follower circuit for impedance conversion of an input signal. Clamp circuit 54 comprises a capacitor 71 and an analog switch 72. Capacitor 71 is adapted to block the DC component of an input signal from buffer circuit 13 and hold the clamping voltage. Analog switch 72 has one end connected to the output side of capacitor 71 and the other end connected to a voltage source of a predetermined potential E to which the signal is clamped. Analog switch 72 is turned ON and OFF by clamp pulses supplied from timing generator 50 to render the supply of clamp potential E to capacitor 71 ON and OFF.

In this clamp circuit 54, analog switch 72 is turned ON by a clamp pulse from timing generator 50 so that clamp potential E is applied to the output of capacitor 71 to be held. Afterward, when analog switch 72 is turned OFF, the clamp potential E held in capacitor 71 is output as a DC offset voltage. The clamp potential E is generally a DC voltage of the order of volts or less or ground potential, depending on the design of A/D converter.

Figure 7:
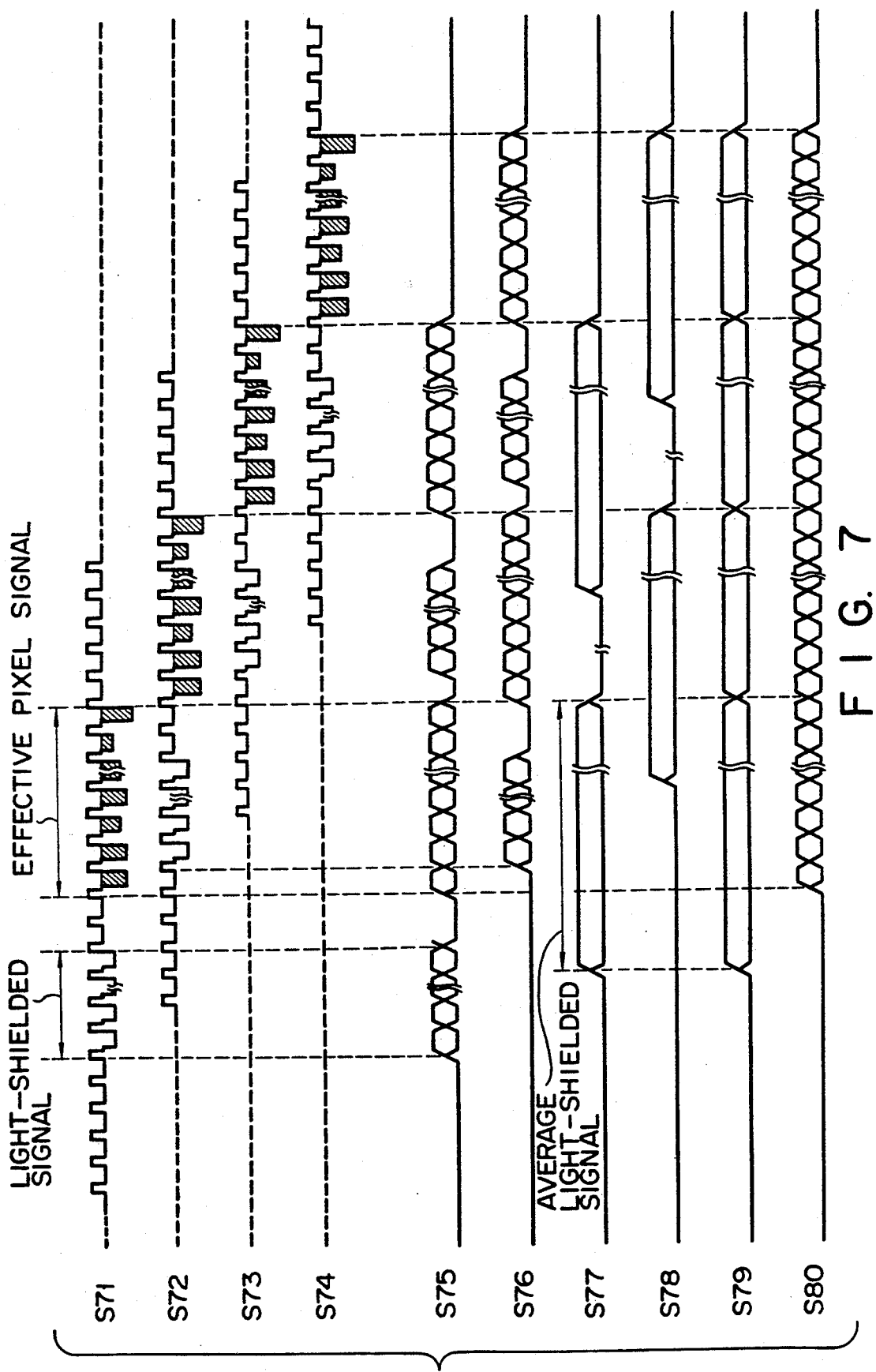
FIG. 7 is a timing diagram of signals developed at various locations within the image reader of FIG. 5.
Figure 8:
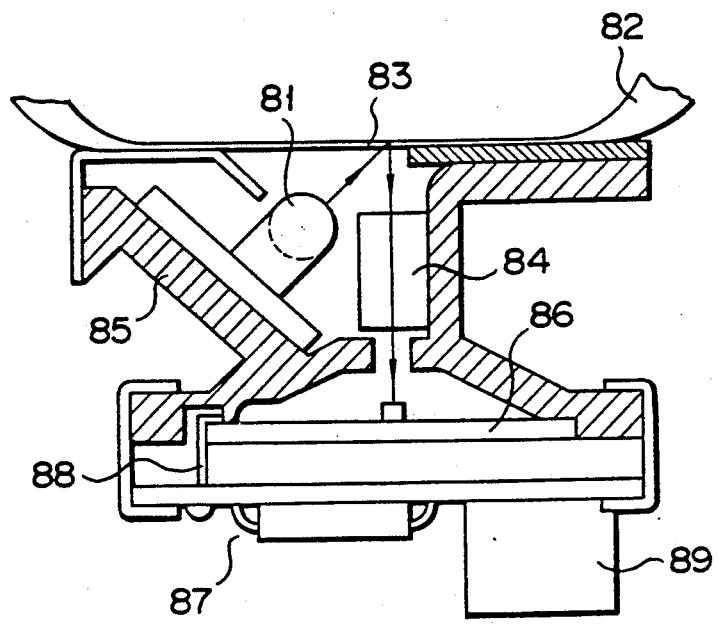
FIG. 8 is a cross sectional view of a conventional contact type image sensor.
Figure 9:
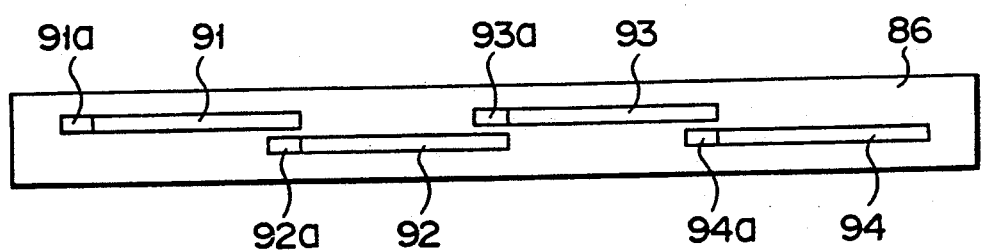
FIG. 9 is a plane view of a conventional multichip image sensor.

Next, the operation of the image reader arranged as described above will be described In the image reader, CCD sensors 12a to 12d are sequentially driven as in the second embodiment, so that such signals as indicated at S71 to S74 in FIG. 7 are taken from CCD sensors 12a to 12d.

Output signals of CCD sensors 12a to 12d are subjected to impedance conversion in buffer amplifiers 13a to 13d and then applied to clamp circuits 54a to 54d, respectively. In each of clamp circuits 54a to 54d, the DC offset voltage of the input signal is clamped to predetermined potential E. As a result, the output signals of CCD sensors 12a to 12d have the same DC offset voltage. Timing generator 50 provides a clamp pulse to each of clamp circuits 54a to 54d while the corresponding CCD sensor performs no scanning operation. Each clamp circuit performs a charging operation during a time interval when the corresponding CCD sensor performs no scanning operation.

The output signals of clamp circuits 54a and 54c are applied to analog multiplexer 55a, while the output signals of clamp circuits 54b and 54d are applied to analog multiplexer 55b. That is, the output signals of CCD sensors 12a to 12d are separated into two groups so that output signals of CCD sensors which are successive in driving sequence may not fall under the same group.

In analog multiplexers 55a and 55b, the output signals of CCD sensors 12a to 12d are serialized for each of the groups to provide first and second group signals, which are then converted to digital signals by A/D converters 58a and 58b, thus producing signals designated as S75 and S76 in FIG. 7.

The light-shielded signals in the first group signal digitized by A/D converter 58a are applied to average-value calculation circuit 59a to be averaged. Similarly the light shielded signals in the second group signal are averaged by average-value calculation circuit 59b. The average light-shielded signals obtained from average-value calculation circuits 59a and 59b are held by latch circuits 60a and 60b, respectively, until the scanning operation of one CCD sensor is completed. Thus, latch circuits 60a and 60b produce such output signals as indicated at S77 and S78 in FIG. 7. The average light-shielded signals for the first and second groups are serialized by digital multiplexer 61b, which is controlled to perform switching between the outputs of latch circuits 60a and 60b at a point of time when the scanning operation of each of CCD sensors 12a to 12d is completed. As a result, the average light-shielded signal indicated at S79 in FIG. 7 is obtained.

On the other hand, the effective pixel signals in the first and second group signals digitized by A/D converters 58a and 58b are serialized by digital multiplexer 61a, which is controlled to perform switching between the outputs of A/D converters 58a and 58b at a point of time when the scanning operation of each of CCD sensors 12a to 12d is completed. As a result, a completely continuous effective pixel signal indicated at S80 in FIG. 7 is obtained.

The effective pixel signal and the average light-shielded signal output from digital multiplexers 61a and 61b are processed in exactly the same manner as the first embodiment in image signal producing circuit 20 to provide an image signal.

As described above, the image reader according to the second embodiment can produce a completely continuous image signal as in the second embodiment and thus obviate special signal processing to allow the image signal to be continuous. Furthermore, the separation of the light-shielded signals from CCD sensors 12a to 12d into two groups for subsequent A/D conversion, averaging and latching thereof, so that CCD sensors which are successive in driving sequence may not fall under the same group, enables the average light-shielded signal to obtained readily.

In addition, since the output signals of CCD sensors 12a to 12d have their DC offset voltages clamped to a predetermined potential E by corresponding clamp circuits 54a to 54d, an image signal can be obtained is constant in DC offset voltage over the entire signal region. Hence the occurrence of an inaccurate image signal which might result from varying DC offset voltage can be avoided, producing an image signal faithfully representing images on a document.

Moreover, since the DC offset voltage of signals applied to A/D converters 58a and 58b is always made constant, the converters can be prevented from overflowing. In addition, since the range of signal voltage applied to A/D converters 58a and 58b is limited to some extent, the circuit scale of A/D converters 58a to 58b can be decreased.

Furthermore, the same advantage as the first embodiment can also be obtained.

The above embodiments may be modified in various ways. That is, the above embodiment adopts various means of "using the average light-shielded signal representing the average of output signals of a plurality of light-shielded pixels as the black reference signal", "making a comparison between the effective pixel signal and the average light-shielded signal to replace that portion of an image signal in which the light-shielded signal is larger than the effective pixel signal in level with a signal of zero level", and "enabling the produced image signal to be output both in digital and analog forms." However, such means are not essential to the present invention.

The present invention need not be limited to the specific embodiments described above. For example, although, in the first and third embodiments, image producing circuit 20 produces an image signal by digital signal processing, analog signal processing may be used instead.

What is claimed is:

1. An image reader comprising:
 a line sensor comprising a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;
 analog to digital conversion means for converting the light-shielded signals to digital light-shielded signals;

holding means for holding the digital light-shielded signals; and image signal producing means for correcting a first signal corresponding to the effective pixel signals in accordance with a second signal corresponding to the digital light-shielded signals held by said holding means, and generating an image signal.

2. An image reader according to claim 1, wherein said image signal producing means includes comparing means for making a comparison in level between the first signal and the second signal; and image signal correcting means for replacing produced image signal with a signal of a zero level when the second signal is larger than the first signal in level.

3. An image reader according to claim 1, wherein said image signal producing means produces the image signal in digital form and includes digital to analog conversion means for converting the produced image signal to an analog signal.

4. An image reader comprising:

image reading means having an array of a plurality of line sensors for generating output signals having DC offset voltages, each of a said sensors has a one-dimensional array of a plurality of photoelectric conversion elements; and a plurality of clamp means provided in correspondence with said line sensors, for clamping the DC offset voltages to a predetermined potential.

5. An image reader according to claim 4, wherein each of said clamp means includes means for performing a charging operation during a time interval in which the corresponding one of said line sensors perform no reading operation.

6. An image reader comprising:

a line sensor having a one-dimensional array of a plurality of photoelectric conversion elements, said plurality of photoelectric conversion elements becoming selectively shaded to provide light-shielded pixels for outputting light-shielded signals and effective pixels which are not shaded for outputting effective pixel signals;

average signal producing means for averaging at least two of the light-shielded signals to produce an average signal;

holding means for holding the average signal produced by said average signal producing means; and image signal producing means for correcting a first signal corresponding to the effective pixel signals in accordance with a second signal corresponding to the average signal held by said holding means.

7. An image reader according to claim 6, wherein said image signal producing means includes comparing means for making a comparison in level between the average signal and the first signal; and image signal correcting means for replacing the produced image signal with a signal of a zero level when the average signal is larger than the first signal in level.

8. An image reader according to claim 6, wherein said image signal producing means produces the image signal in digital form and includes digital to analog conversion means for converting the produced image signal to an analog signal.

9. An image reader comprising:

image reading means comprising an array of a plurality of line sensors each of which is a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;

drive controlling means for sequentially driving said line sensors at such timing as to allow the effective pixel signals output to be continuous in time; and signal selecting means for selecting the effective pixel signals to output the selected signal as a serial signal.

10. An image reader comprising:

image reading means comprising an array of a plurality of line sensors each of which is a one-dimensional array of a plurality of photoelectric conversion elements for outputting photoelectric conversion signals, said plurality of photoelectric conversion elements being selectively shaded to provide light-shielded pixels for outputting light-shielded signals and effective pixels which are not shaded for outputting effective pixel signals;

drive controlling means for sequentially driving said line sensors in a predetermined order at a predetermined timing so that the effective pixel signals are continuously outputted;

group-serializing means for driving the photoelectric conversion signals output from said line sensor into a plurality of groups each having the photoelectric conversion signals which are not neighbored to one another and which are selectively extracted from the photoelectric conversion signals output from said line sensors, and serializing the selectively extracted signals for each group to produce a serialized photoelectric conversion signal;

analog to digital conversion means for converting the serialized photoelectric conversion signals to digital serialized photoelectric conversion signals;

holding means for holding light-shielded signals in the digital serialized photoelectric conversion signals;

black reference signal producing means for serializing the light-shielded signals held by said holding means for separate groups to produce a black reference signal;

effective signal producing means for serializing the effective pixel signals in the digital serialized photoelectric conversion signals to produce a serial effective pixel signal; and image signal producing means for correcting the serial effective pixel signal in accordance with the black reference signal and for generating an image signal.

11. An image reader according to claim 10, wherein said image signal producing means produces the image signal in digital form and includes digital to analog conversion means for converting the produced image signal to an analog signal.

12. An image reader according to claim 10, wherein said image signal producing means includes comparing means for making a comparison in level between the first signal and the second signal; and image signal correcting means for replacing the produced image signal with a signal of a zero level when the second signal is larger than the first signal in level.

13. A method of reading an image comprising the steps of:

converting reflected light from a document into a photoelectric conversion signal by the use of a line sensor of a one-dimensional array of a plurality of photoelectric conversion elements, said plurality of photoelectric conversion elements being selectively shaded to provide light-shielded pixels for outputting light-shielded signals and effective pixels which are not shaded for outputting effective pixel signals;

converting the light-shielded signals into digital light-shielded signals;

holding the digital light-shielded signals; and correcting a first signal corresponding to the effective pixel signals in accordance with a second signal corresponding to the held light-shielded signals.

14. A method of reading an image comprising the steps of:

converting reflected light from a document into a photoelectric conversion signal having DC offset voltages, by the use of image reading means comprising an array of a plurality of line sensors each of which includes a one-dimensional array of a plurality of photoelectric conversion elements; and setting the DC offset voltages to a predetermined potential.

15. A method of reading an image comprising the steps of:

converting reflected light from a document into a photoelectric conversion signal by the use of a line sensor having a one-dimensional array of a plurality of photoelectric conversion elements, said plurality of photoelectric conversion elements being selectively shaded to provide lightshielded pixels for outputting light-shielded signals and effective pixels which are not shaded for outputting effective pixel signals;

averaging at least two of the light-shielded signals to produce an average signal;

holding the average signal; and correcting a first signal corresponding to the effective pixel signals in accordance with a second signal corresponding to the held average signal.

16. A method of reading an image comprising the steps of:

sequentially driving a plurality of line sensors for producing photoelectric conversion signals, each of said line sensors having effective pixels for producing effective pixel signals and light-shielded pixels for producing light-shielded signals, at such timing as to allow the effective pixels signals to be continuous in time;

converting reflected light from document in a photoelectric conversion signals by means of the line sensors; and selecting the effective pixel signals to output the selected signal as a serial signal.

17. A method of reading an image comprising the steps of:

sequentially driving a plurality of line sensors for producing photoelectric conversion signals, each of said line sensors having effective pixels for producing effective pixel signals and light-shielded pixels for producing light-shielded signals, in a predetermined order at a predetermined timing so that the effective pixel signals are continuously outputted;

converting reflected light from a document into a photoelectric conversion signal by means of said line sensors;

dividing the photoelectric conversion signals output from said line sensor into a plurality of groups each having the photoelectric conversion signals which are not neighbored to one another and which are selectively extracted from the photoelectric conversion signals output from said line sensors, and serializing the selectively extracted signals for each group to produce a serialized photoelectric conversion signal;

digitizing the serialized photoelectric conversion signals for each of groups;

holding light-shielded signal in the digitized photoelectric conversion signals for each of groups for a predetermined time interval;

serializing the light-shielded signals held for the respective groups to produce a black reference signal;

serializing the effective pixel signals in digitized photoelectric conversion signals for the respective groups to produce a serial effective pixel signal; and correcting the serial effective pixel signal in accordance with the black reference signal to produce an image signal.

* * * * *